United States Patent
Kim et al.

(10) Patent No.: US 8,443,418 B2
(45) Date of Patent: May 14, 2013

(54) METHOD AND APPARATUS FOR MANAGING REMOTE ACCESS AUTHORITY IN UPNP REMOTE ACCESS SERVICE

(75) Inventors: Jun-Hyung Kim, Suwon-si (KR); Se-Hee Han, Seoul (KR); Je-Young Maeng, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 118 days.

(21) Appl. No.: 13/081,017

(22) Filed: Apr. 6, 2011

(65) Prior Publication Data
US 2011/0247052 A1    Oct. 6, 2011

(30) Foreign Application Priority Data
Apr. 6, 2010    (KR) .................. 10-2010-0031568

(51) Int. Cl.
*H04L 9/32* (2006.01)
(52) U.S. Cl.
USPC ....................................... 726/2; 726/3; 726/4
(58) Field of Classification Search ............... 726/1–7; 713/150, 155, 168–170
See application file for complete search history.

(56) References Cited

U.S. PATENT DOCUMENTS

| | | | | |
|---|---|---|---|---|
| 6,658,415 | B1 * | 12/2003 | Brown et al. | 1/1 |
| 7,689,510 | B2 * | 3/2010 | Lamkin et al. | 705/51 |
| 2006/0265600 | A1 * | 11/2006 | Mimura et al. | 713/182 |
| 2007/0094716 | A1 | 4/2007 | Farino et al. | |

FOREIGN PATENT DOCUMENTS

| | | |
|---|---|---|
| KR | 1019990040321 | 6/1999 |
| KR | 1020060109001 | 10/2006 |

* cited by examiner

*Primary Examiner* — Hosuk Song
(74) *Attorney, Agent, or Firm* — The Farrell Law Firm, P.C.

(57) ABSTRACT

A method for managing a remote access authority information of a remote access service server including receiving a remote access authority list from a remote access server for a first user and registering the remote access authority list, by the remote access service server; when the remote access service server receives a remote access authority addition request for a second user from a communication device of the first user, giving a remote access authority to the second user and renewing the remote access authority list; transmitting information of the remote access authority given to the second user to the remote access server of the first user in order to synchronize the renewed access authority list with the remote access server of the first user; notifying the communication device of the first user whether the remote access authority addition is successful.

11 Claims, 6 Drawing Sheets

METHOD AND APPARATUS FOR MANAGING REMOTE ACCESS AUTHORITY IN UPNP REMOTE ACCESS SERVICE

PRIORITY

This application claims priority under 35 U.S.C. §119(a) to a Korean Patent Application entitled "Method and Apparatus for Managing Remote Access Authority in UPnP Remote Access Service" filed in the Korean Intellectual Property Office on Apr. 6, 2010 and assigned Serial No. 10-2010-0031568, the entire disclosure of which is incorporated herein by reference.

BACKGROUND OF THE INVENTION

1. Field of the Invention

The present invention relates generally to a remote access service using Universal Plug and Play (UpnP), which is a home network middleware protocol, and more particularly, to a method and an apparatus for managing access authority information required for a remote access between a home network and an outside device or between home networks.

2. Description of the Related Art

In general, a home network is configured by a private network based on the Internet Protocol (IP), and controls such that all types of various devices such as a Personal Computer (PC), an intelligent product, a wireless device, and the like are connected with one network through a common virtual computing environment called middleware.

The middleware connects various digital devices by a peer-to-peer method to enable communication between the devices to be possible. As the middleware, a Home AV Interoperability (HAVI), a UPnP device, a Java Intelligent Network Infra-structure (Jini), an Home Wide Web (HWW), and the like are proposed.

After a Plug and Play (PnP) function is added to a current operating system, it is much easier to install and setup peripheral devices of the PC. UPnP is a technology which enables network devices such as various electric home appliances, a network printer, and an Internet gate to perform a networking, especially a home networking, by extending the convenient function to a whole network, based on Internet standard technology such as a Transmission Control Protocol/Internet Protocol (TCP/IP), a HyperText Transfer Protocol (HTTP), and an eXtensible Markup Language (XML).

UPnP includes a Controlled Device (CD), which is a device connected to the home network to be controlled, and a Control Point (CP) to control the CD. Further, the UPnP network communicates between the CD and the CP by using the UPnP protocol stack structure including an Internet protocol such as the TCP/IP, HTTP, and technology such as XML, and Simple Object Access Protocol (SOAP).

FIG. 1 illustrates a general UPnP remote access architecture. The UPnP remote access architecture shown in FIG. 1 is from a document of Remote Access Architecture version 1.0 of the UPnP Forum.

Referring to FIG. 1, a remote access client 1100 includes a CP 1130, a Remote Access Discovery Agent (RADA) 1110, an RAC 1120, a device 1140, and an Remote Access Transport Agent (RATA). A remote access server 1200 includes an RADA 1210, an RAS 1220, and an RATA 1230. A home device 1300 and a management console 1400 are connected to the remote access server 1200 by a LAN.

The RAC 1120 and the RADA 1110 of the remote access client 1100, and the RAS 1220 and the RADA 1210 of the remote access server 1200 refer to a UPnP RA device.

A RADASync CP 1113 and a RADASync CP 1212 refer to a remote access-related UPnP CP, and a RADASync 1112, a RATAConfig 1224, a RADASync 1211, a RADAConfig 1223, a RATAConfig 1121, and an Inbound Connection Config 1221 refer to a remote access-related UPnP service.

An RADA Listener/Relay 1222 and an RADA Listener/Relay 1111 refer to a support component of the RADA, and the CP and the device 1140 refer to the UPnP CP, the device, and the service, which are not related to the remote access.

A current basic UPnP architecture (version 1.0) is operated in a UPnP device discovery, and the like, based on an Simple Service Discovery Protocol (SSDP), and the SSDP is a protocol of basically using an IP multicast. However, since a current IP multicast cannot guarantee normal operation in an Internet range, the control of the UPnP device is also impossible through the Internet. Therefore, the UPnP remote access architecture is proposed in order to enable the UPnP device and the CP device to be operated as if they are physically located in the home network even when they must be accessed through the Internet.

As shown in FIG. 1, the UPnP remote access architecture defines the UPnP remote access server 1200, the UPnP remote access client 1100, and the UPnP RADA devices 1110 and 1220, and generates an RAT channel through the RATA 1150 and 1230. The physical remote access server 1200 and the remote access client 1100 commonly include the UPnP RADA 1110 and 1220, and include the UPnP RAC 1120 and the UPnP RAS 1220, respectively.

The UPnP RADA 1110 and 1220 devices can synchronize a list of the UPnP device operating on the home network in which the remote access server 1200 is included, with a list of the UPnP device included in the remote access client 1100. Also, the UPnP RADA 1110 and 1220 devices can control an SSDP message so that the UPnP CP device on the home network in which the UPnP RADA 1110 and 1220 devices are included can find the UPnP device on the remote network. The UPnP CP device, which has found the UPnP device on the remote network, transmits a control message in order to use a service provided by a corresponding device, and the message is directly delivered to the UPnP device on the remote network through a transport channel.

In the UPnP remote access architecture, a service for a remote access transport channel setup is performed by a process of setting the Inbound Connection Configuration (ICC) 1221, the Dynamic DNS (DDNS), and an Session Traversal Utilities (STUN) server address, and reporting information (related to NAT, and whether the RAS and the IGD are in the same place) collected by an STUN client to a Management Console (MC) 1400.

The MC 1400 performs a remote access-related setup and monitors an operation. The RATAConfig 1121 and 1223 service is a common service of the RAS 1220/RAC 1120. The MC 1400 sets a required parameter by calling an RATA 1230 setup service interface, based on the information reported by the ICC 1221. It is assumed that the service is performed when both RAS 1220 and RAC 1120 are in the home.

When the service for the RADA 1110 and 1210 setup is provided, the RADAConfig sets filters for the RADA 1110 and 1210. It is determined whether a filtering of information regarding an export/import filter-RAC/home device is needed. The RADA 1110 and 1210 can synchronize a tree-type network image with regard to the UPnP device lists of local and remote networks. When the device is added to the local network, an AddRemoteDevice( ) interface of the remote network is called, and the newly added device is added to a remote network node of the network image. The reverse is also the same as the above case.

When the device joins or leaves the network while RAD-AListener 1111 and 1112 monitor an SSDP message, function modules provide the SSDP message to the RADA 1110 and 1210. The RADARelay 1111 and 1222 reconstruct an action of the remote RADA to the SSDP message, transmit the SSDP message to the local network, and then respond to an SSDP query (M-Search) with regard to the remote device of the local device.

Referring to FIG. 1, an operation of the UPnP remote access architecture is as follows.

1. The MC 1400 obtains an outside IP address from the IGD, calls an ICC service 1221 interface of the RAS 1220, and then sets STUN server and DDNS server addresses, and the like.

2. The MC 1400 calls the RATAConfig 1121 and 1223 services of the RAS 1220 and RAC 1120, and sets a parameter (Profile) for an RA transport channel (generally, a VPN). In step 2, it is assumed that the RAS 1220 and the RAC 1120 are on the same network.

3. The RAC 1120 moving to an outside network generates the RAT connection, based on the RATAConfig 1121 information set in step 2.

4. The RADA 1110 and 1210 of the RAC 1120 and the RAS 1220 synchronize the network image through the RAT channel generated in step 3. The RAS 1220 can set the filter of the device list of the local network disclosed to the outside through the RADAConfig service as shown in FIG. 1

5. The RAC 1120 finds the service of the RAS 1220 (The RAC finds the service of the RAS from the synchronized network image). A service provided by the device, which has been filtered by the RADAConfig service of the RAS 1220, cannot be found.

6. The RAC 1120 can directly make a request for the found service through the RAT channel. The RAS 1220 then functions only as a router.

The home device provides the processing and result in response to the request of the actual RAC 1120.

According to the above procedure, the RAC requires access authority for the RAC for the connection between RAC-RAS. Thus, a user sets the access authority to the RAS for the RAC through the RADAConfig procedure by using the MC 1400 in advance. Accordingly, when a particular RAC desires to access the RAS, an advance registration procedure is necessary, and the procedure is performed in the home. As a result, when the user is outside the home, it is impossible to access.

FIG. 2 is an illustrates a situation in which an access authority setup cannot be performed in a conventional remote access system. Referring to FIG. 2, the situation in which the access authority setup cannot be performed in the remote access system is described. For example, when a user A 230 meets a user B 240 outside of the home, and user A 230 desires to transmit presentation data, which are in the home of user A, to user B 240, user B 240 cannot access a file server 250 in the home network of user A 230 if user B 240 is not registered to the RAS 220. As described above, when a user is located at the outside of the home, even if the user desires to give an access authority to another user in order to access the RAS 220 of the user, an access authority setup is impossible because of the inability to access the MC 210 in the home.

SUMMARY OF THE INVENTION

Accordingly, the present invention has been made in order to provide a method and an apparatus for managing remote access authority in order to modify an access authority list of a remote access server of a network inside the home, in a remote access system even when a user is outside the home.

In accordance with an aspect of the present invention, a method for managing remote access authority information of a remote access service server is provided, the method includes receiving a remote access authority list from a remote access server of a first user and registering the remote access authority list, by the remote access service server; when the remote access service server receives a remote access authority addition request of a second user from a communication device of the first user, giving a remote access authority to the second user and renewing the remote access authority list; transmitting information of the remote access authority given to the second user to the remote access server of the first user in order to synchronize the renewed access authority list with the remote access server of the first user; informing the communication device of the first user whether the remote access authority addition was successful.

The method may further include performing a remote access service between a remote access client of the second user and the remote access server of the first user, and performing a remote access service between a remote access server of the second user and the remote access server of the first user.

The method may further include transmitting an access authority list related to the first user to a remote access client of the first user or the remote access server of the first user when the remote access service server receives an access authority list request from the remote access client of the first user or the remote access server of the first user.

In accordance with another aspect of the present invention, a remote access service server for managing remote access authority information is provided, the remote access service server includes a Request Message Processor to receive a remote access authority list from a remote access server of a first user and a remote access authority list request; an Authentication Processor to perform an authentication of the received request message; a database manager to store the remote access authority list; a database access processor to read an access authority list data from the database manager; a Response Message Processor to process a response message according to a control of an Access Authority List Processor; the Access Authority List Processor to give a remote access authority to a second user and renew the remote access authority list when the Access Authority List Processor receives a remote access authority addition request of the second user from a communication device of the first user, to transmit new remote access authority information to the remote access server of the first user through the Response Message Processor in order to synchronize a renewed access authority list with the remote access server of the first user, and to inform the communication device of the first user of a fact whether the remote access authority addition is successful.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, the first embodiments of the present invention will be described with reference to the accompanying drawings. In the following description, particular details such as a specific construction device, and the like are provided only to help with the general understanding of the present invention, and it would be apparent to those having ordinary skill in the art that various modifications, additions and substitutions are possible, without departing from the scope and spirit of the invention as disclosed in the accompanying claims and their equivalents. Further, a detailed explanation of known related functions and constitutions may be omitted to avoid unnecessarily obscuring the subject matter of the present invention.

The present invention provides a method and an apparatus for managing access authority information required for a remote access between a home network and an outside device or between home networks, through a server provided by a service provider.

Figure 1:
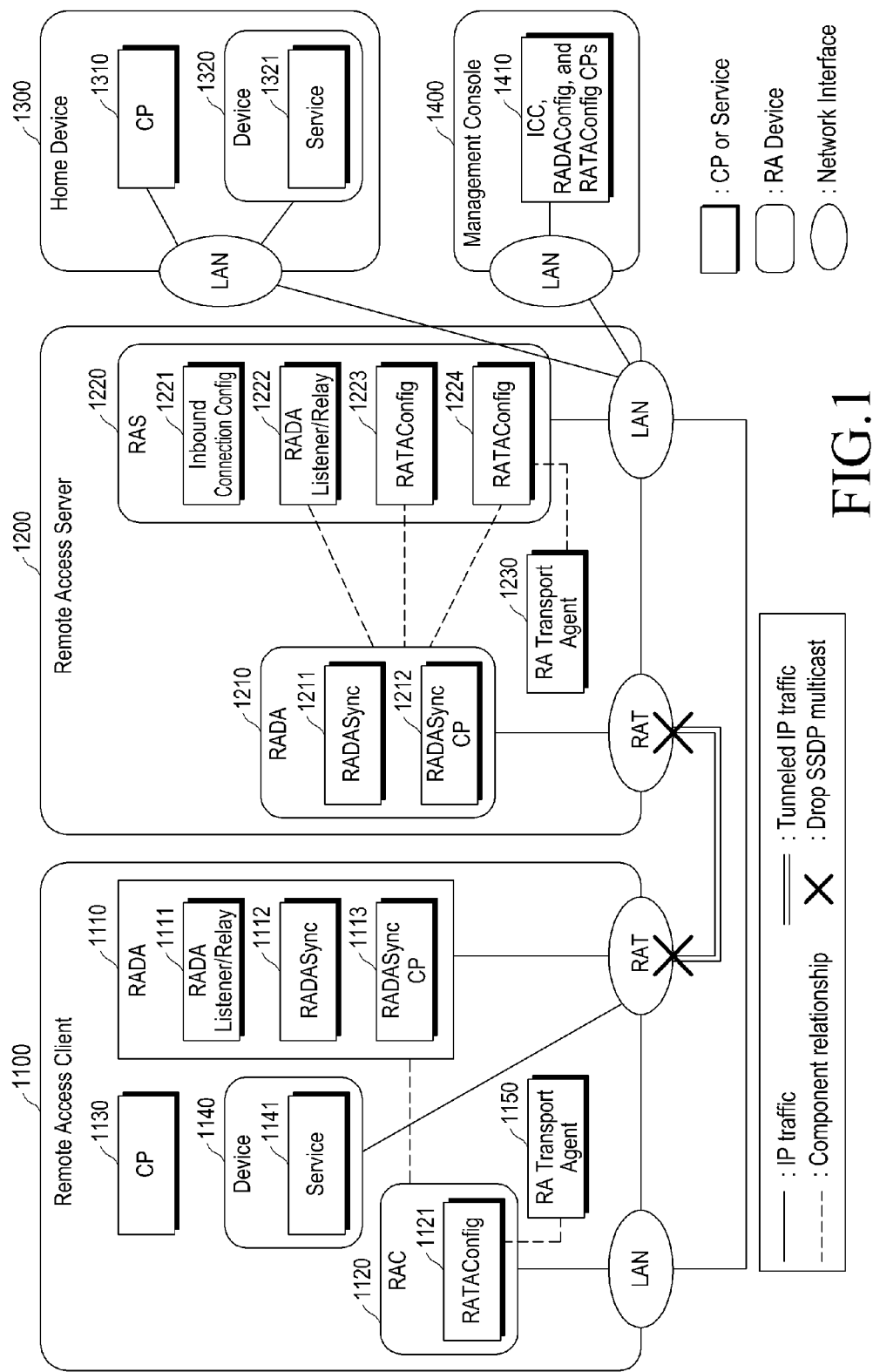
FIG. 1 illustrates a general UPnP remote access architecture (version 1.0)
Figure 2:
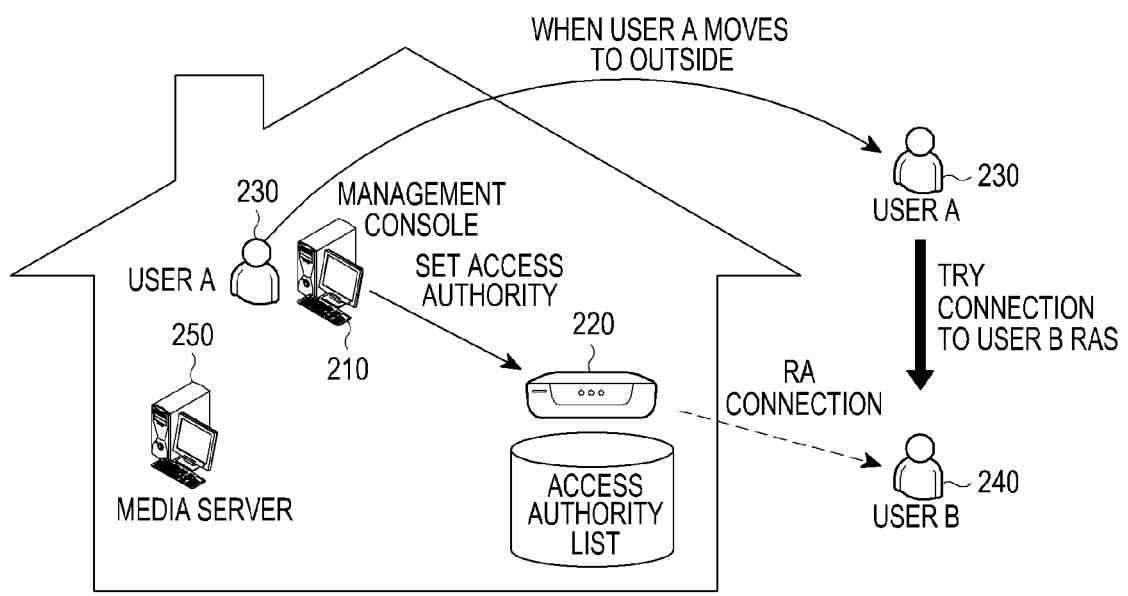
FIG. 2 illustrates a situation in which an access authority setup cannot be performed in a conventional remote access system.
Figure 3:
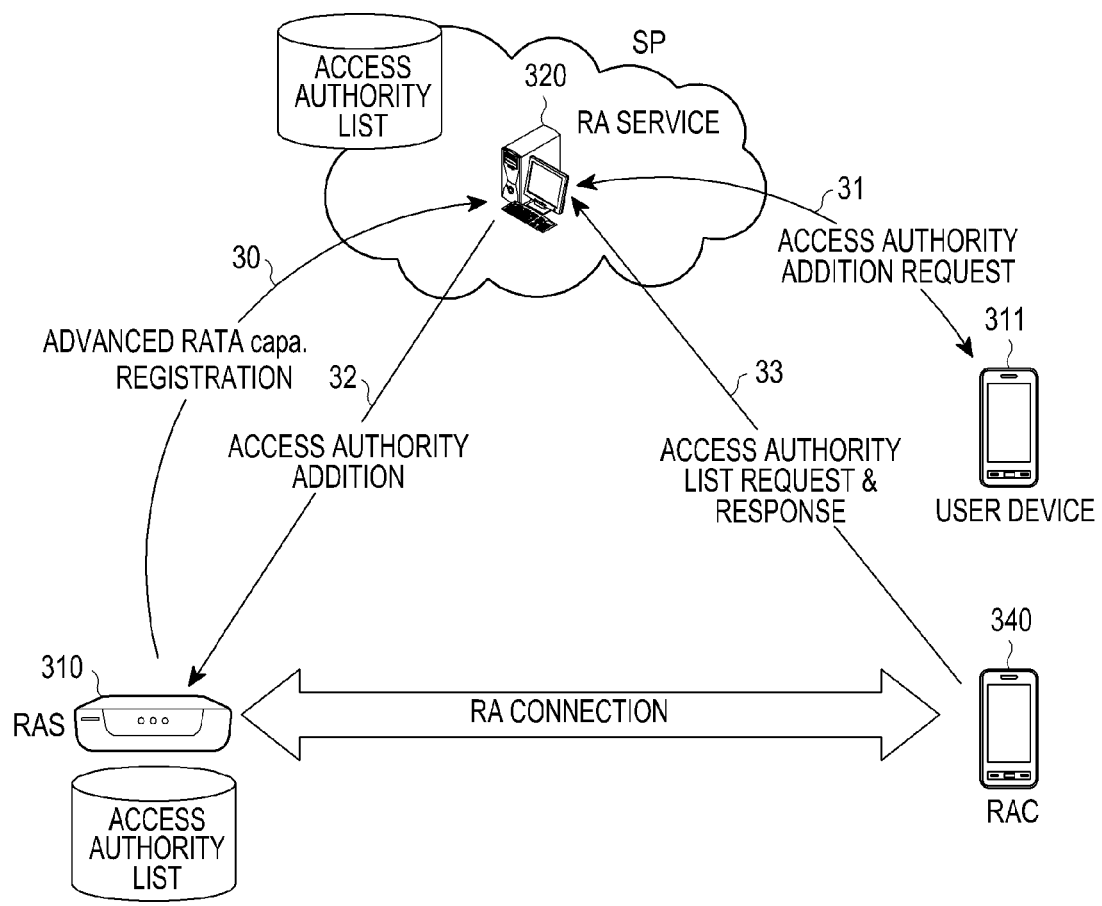
FIG. 3 illustrates a remote access service architecture for managing a provider based remote access authority information according to an embodiment of the present invention.

FIG. 3 illustrates a remote access service architecture for managing an provider based remote access authority information according to an embodiment of the present invention. According to the present invention, a remote access service system includes a user device 311, an RAS 310, an RA service server 320, and an RAC 340.

The user device 311, which can access the Internet outside the home, refers to a communication apparatus such as a mobile terminal having mobile communication functions such as Wideband Code Division Multiple Access (W-CDMA), High-Speed Packet Access (HSPA), Worldwide Interoperability for Microwave Access (WiMAX), and the like, or a Wireless Local Area Network (WLAN) communication device accessible to a WLAN Access Point (AP). The user device 311 can be operated as the RAC defined in the UPnP. Further, according to an embodiment of the present, the user device 311 has functions, which can add, modify, and delete the access authority list of the RAS 310, by accessing the RA service server 320.

The RAC 340 is a client for performing a remote access connection to the actual RAS 310. The RAC 340 has functions, which can identify the RAC list accessible to the RAS 310 in the home of the RAC 340 or identify all lists of the RAS 310, which the RAC 340 can access, by accessing the RA service server 320 as well as a function of the conventional RAC 340.

The RAS 310 is a server for providing a remote access connection with the RAC 340. According to an embodiment of the present invention, the RAS 310 has functions for providing the RA service server 320 with an access authority list, which the RAS 310 has stored, or receiving the access authority list, which the RA service server 320 has, as well as a function of the conventional RAS 310. Further, through such functions, RAS 310 can provide a function of synchronizing with the RA service server 320.

As a server which a service provider manages, the RA service server 320 manages access authority lists of the RAS 310 and the RAC 340, which are RA service users. The RA service server 320 performs functions such as requests for adding, modifying, deleting, and requesting status from the access authority list from the user device 311. Further, the RA service server 320 performs a function of synchronizing the access authority list of the RA service server 320 with the access authority list of the RAS.

Referring to FIG. 3, in initial step 30, the RAS 310 registers a remote access authority list, which the RAS 430 has, to the RA service server 320 in advance in step 31, when the RA service server 320 receives an access authority addition request message for a RAC 340 that is located at the outside of the home from user device 311, in step 32, the RA service server 320 sends the access authority addition request message for the RAC 340 to RAS 310. Then, in step 33, RAC 340 requests an access authority lists to RA service server 320, receives the access authority lists from RA service server 320 in response, and performs the remote access to RAS 310.

Figure 4:
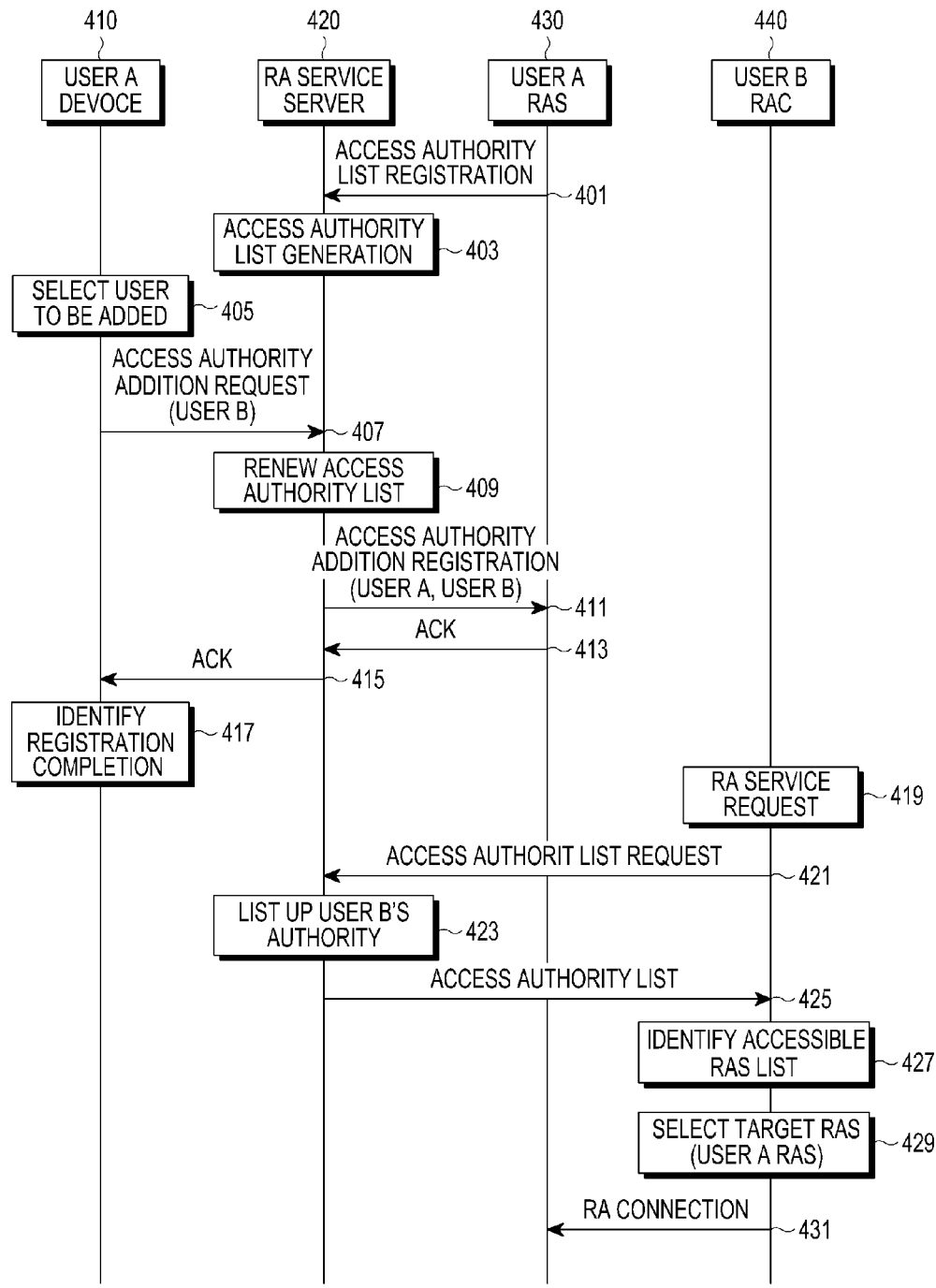
FIG. 4 illustrates a sequence diagram of remote access authority information management according to an embodiment of the present invention.

FIG. 4 illustrates a sequence diagram of a remote access authority information management according to an embodiment of the present invention.

Referring to FIG. 4, in initial step 401, the RAS 430 of user A, located in the home, registers a remote access authority list, which the RAS 430 has, to the RA service server 420. In step 403, the RA service server 420 generates the remote access authority list and stores the generated remote access authority list.

When user A moves to the outside of the home and desires to give access authority to user B who is also located at the outside of the home, user A's device 410 in the outside of the home selects a user (referring to user B in an embodiment of the present invention) to be added to the access authority in step 405 and sends an access authority addition request message of user B to the RA service server 420 in step 407. Information regarding the selected user is included in the access authority addition request message. User A can directly access the RA service server 420 when user A is located inside the home as well as outside of the home, so that user A can add a user to the access authority list.

In step 409, the RA service server 420, which has received the access authority addition request message, renews the access authority list of user A to the RAS 430, which is stored in the RA service server 420.

In step 411, the RA service server 420 transfers the added access authority information to the RAS 430 of user A. In step 413, the RAS 430 of user A notifies the RA service server 420 of successfully registering the access authority addition through an acknowledgement message. In step 415, the RA service server 420 notifies the device 410 of user A, who has requested an addition to the access authority, of whether the access authority addition is successful through an acknowledgement message.

In step 417, the device 410 of user A receives an acknowledgement message and identifies a remote access authority registration completion of user B. Therefore, the synchronization between the RA service server, in which the access authority list modified by user A is registered, and the RAS 430 of user A is performed.

Subsequently, when the RAS 440 of user B wants to use a remote access service with the RAS 430 of user B in step 419, the RAC 440 of user B transmits an access authority list request message to the RA service server 420 in step 421.

User B can select a menu related to the remote access service of the RAC 440 of user B and then execute the menu.

In step 423, the RA service server 420 selects the RAS 430 having a list including user B among the access authority lists of the RASs, which the RA service server 420 manages, and generates an RAS list, which user B can access.

In step 425, the RA service server 420 transfers the generated RAS list to the RAC 440 of user B.

User B, who has received the RAS list, identifies that the RAS 430, which is desired for a remote access connection, exists in the RAS list in step 427, and then selects the RAS 430 of user A in step 429. In step 431, the RAC 440 of user B selects the RAS 430 of user A, performs an RA connection setup procedure, and then performs the remote access connection.

TABLE 1

| Element/Attribute | Description |
| --- | --- |
| Subscription ID | Service Provider (SP) unique. ID allocated when subscribing to an SP based RA authority information management service, the SP manages users by using the Subscription |
| RAS ID | User unique. An ID of the RAS managed by one user |
| RAS Description | A brief description of the RAS added by a selection of the user |
| Update type | Add/Delete/Modify |
| Target RAC | Information regarding the RAC, which wants to modify an access authority |
| RAC ID | Public ID of the RAC, e.g. SIP URI |
| Nick name | User friendly ID. An ID, which the user desires to assign, other than the Public ID of the subject RAC |

Table 1 refers to a data model of RA access authority information transferred to a remote access service server by a user device. That is, the Table 1 is an example of information which may be included in a message transferred in step 407 of FIG. 3. The information of table 1 can be included in the message as an XML type or a plain text type, and the message can then be transferred.

A Subscription ID of the message is an ID allocated to a user from a service provider when the user subscribes to an RA access authority information service, and has an unique value in a particular service provider area.

An RAS ID refers to an ID of the RAS, which the user registers to the service provider. In a large or medium sized network such as a Small Office/Home Office (SOHO), an Office, and the like, two or more RASs can be managed by one user. In order to distinguish the two or more RASs by one subscription, the RAS ID can be used.

A description is an element for adding the description with regard to the RAS included in the user. The description can be added by the selection of the user and may be used by another party which will use the RA connection.

An Update type is information for indicating whether an access authority of a Target RAC is newly generated, deleted, or the existing access authority information is modified.

The Target RAC, which is information about the RAC, which wants to modify the actual access authority information, includes elements of a Nickname. An RAC ID refers to an ID of the RAC device, which desires to allow or delete the RA connection. A public ID is used as the RAC ID. As the embodiment of the public ID, an SIP URI, a telephone number, an e-mail address, and the like can be used. The Nickname is an alias assigned to the RAC when the user gives the access authority to the RAC, unlike the RAC ID. The Nickname can be used to easily distinguish the actual RAC by the user. The access authority list data model can put a plurality of Target RAC information into one message and then transfer the message.

TABLE 2

| Element/Attribute | Description |
| --- | --- |
| Subscription ID | SP unique. An ID allocated when subscribing to an SP based RA authority information management service, the SP manages users by using the Subscription. |
| RAC ID | User unique. An ID of the RAS managed by one user |
| Target RAS | Information of the RAS, to which the RAC has an access authority |
| RAS ID | A Public ID of the RAS, e.g. SIP URI |
| Nick name | User friendly ID. An ID, which the user assigns, other than the Public ID of the subject Public ID |
| Description | A description of the RAS stated by a user of the RAS |
| IP address | An IP address of the RAS |

Table 2 refers to a data model with regard to the RAS list, which the RA service server transmits to the RAC and the RAC can access. That is, the Table 2 means information included in the message of step 421 of FIG. 3

The information of Table 2 can be included in the message in an XML type or a plain text type and then the message can be transferred.

A Subscription ID is an ID assigned to a user by a service provider when the user subscribes to an RA access authority information service and has an intrinsic value in a particular service provider area.

An RAC ID is an ID of the RAC, which the user registers to the service provider, and an accessible RAS list is generated in accordance with the RAC ID. When the RAS of user B makes a request for the accessible RAS list, ID information of the RAS, which responds to the request, is included in this field.

A Target RAS refers to information of the RAS, which gives an access authority to a corresponding RAS. The Target RAS includes elements of an RAS ID, a Nickname, a Description, and an IP address. The RAS ID refers to a public ID of the Target RAS and an SIP Uniform Resource Identifier (URI), a telephone number, an email address, and the like can be used as the RAS ID. The Nickname is an alias set by an owner of the Target RAS.

The Description is RAS information prepared by the owner of the Target RAS. The IP address, which is an IP address of the Target RAS, is used as a destination address in the RA connection.

The data of Tables 1 and 2 are transferred between the user device and the RA service server. Various protocols, which can transfer the data, can be used as well as the protocol described in the invention, but a method using two protocols in order to transfer the data will be described in the present invention.

First, a method using the HTTP for data transmission will be described.

HTTP is the most generally used protocol, and is used for processing a service request and a service response between a server and a client. In order to transfer the data, an HTTP POST method is used, and the data of Table 1 is transferred in a body of a message in an XML type message. A request for the RAS list, which the user can access, is performed by using the HTTP POST method or an HTTP GET method. In response to the request, the RA service server transfers the accessible RAS list described in Table 2 to a body of an HTTP response message.

Second, a method using an SIP is described.

The SIP protocol can be used for the data request and the data transmission of Tables 1 and 2. The user uses an SIP MESSAGE method or an SIP PUBLISH method for the data transmission of Table 1. When the user uses each of the methods, the data is included in a body of the message and the message is then transferred. The SIP MESSAGE method is used for the data transmission of Table 2. A request message of the user is transferred to the RA service server by using the SIP MESSAGE method. The RA service server puts the data of Table 2 into a body of the SIP MESSAGE method and then transfers the data to the RAC made the request for the data.

Figure 5:
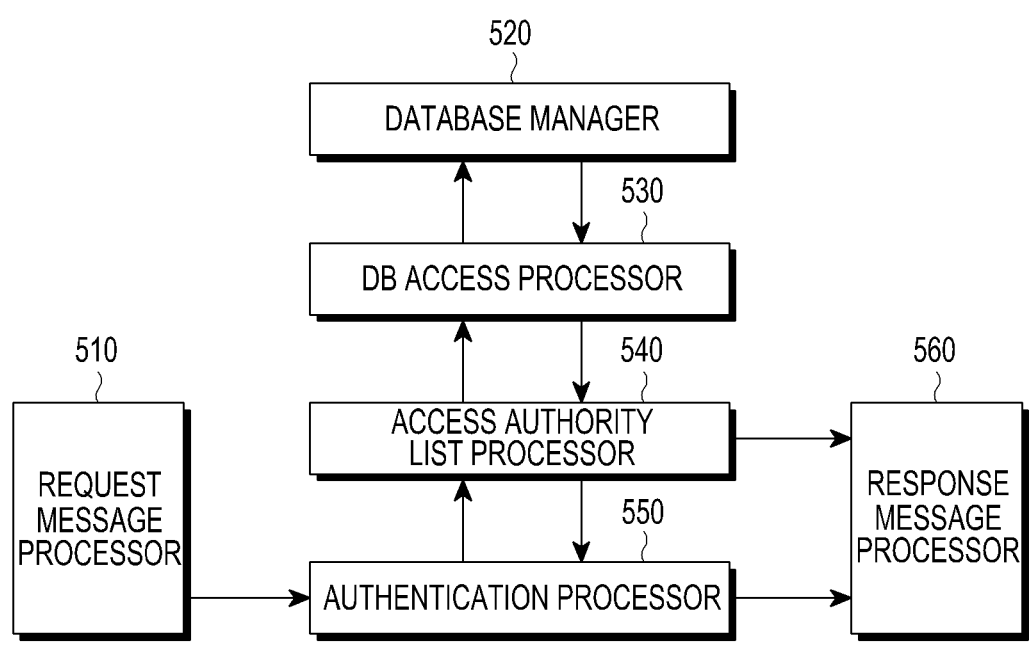
FIG. 5 illustrates a block diagram of a remote access service server according to an embodiment of the present invention.

FIG. 5 illustrates a block construction of a remote access service server according to an embodiment of the present invention The RA service server includes a Request Message Processor 510, a Response Message Processor 560, an Authentication Processor 550, an Access Authority List Processor 540, a DataBase (DB) Access Processor 530, and a DB Manager 520.

The Request Message Processor 510 processes an access authority modification request of the user device or an access authority list request. When the Request Message Processor 510 receives the request message from the user, the Request Message Processor 510 transmits the message to the Authentication Processor 550. The Authentication Processor 550 is a function block in order to perform an authentication procedure for the request message. A description of the details of the authentication procedure is omitted since it is not within the scope of the invention, and the conventional message authentication method may be applied. When the authentication is successfully completed, the request message is transferred to the Access Authority List Processor 540.

The Access Authority List Processor 540 processes the data included in the request message. When the Access Authority List Processor 540 receives an access authority modification message, the data included in the request message is separated, transferred to the DB Access Processor 530, and then transferred to the DB Manager 520, so that the access authority is modified.

The DB Access Processor 530 functions as a proxy for enabling the request message of the user to not directly access the DB. When the request message of the user is the access authority list request, the Access Authority List Processor 540 reads an RAS list, which a corresponding user can access, and information of the RAS list from the DB Manager 520 through the DB Access Processor 530 and then constructs data to be transferred to the user. The constructed data is then transferred to the Response Message Processor 560, and the Response Message Processor 560 makes a message suitable for the user and then transfers the message to the user. If the authentication procedure for the request message of the user fails, the Authentication Processor 550 transfers content which includes the authentication failure to the Response Message Processor 560 and the Response Message Processor 560 transfers a message of the authentication failure to the user.

The present invention can be used in the RA connection between two home networks, that is, the RA connection between one RAS and another RAS as well as the access authority information management for the RA connection between the RAS and the RAC.

Figure 6:
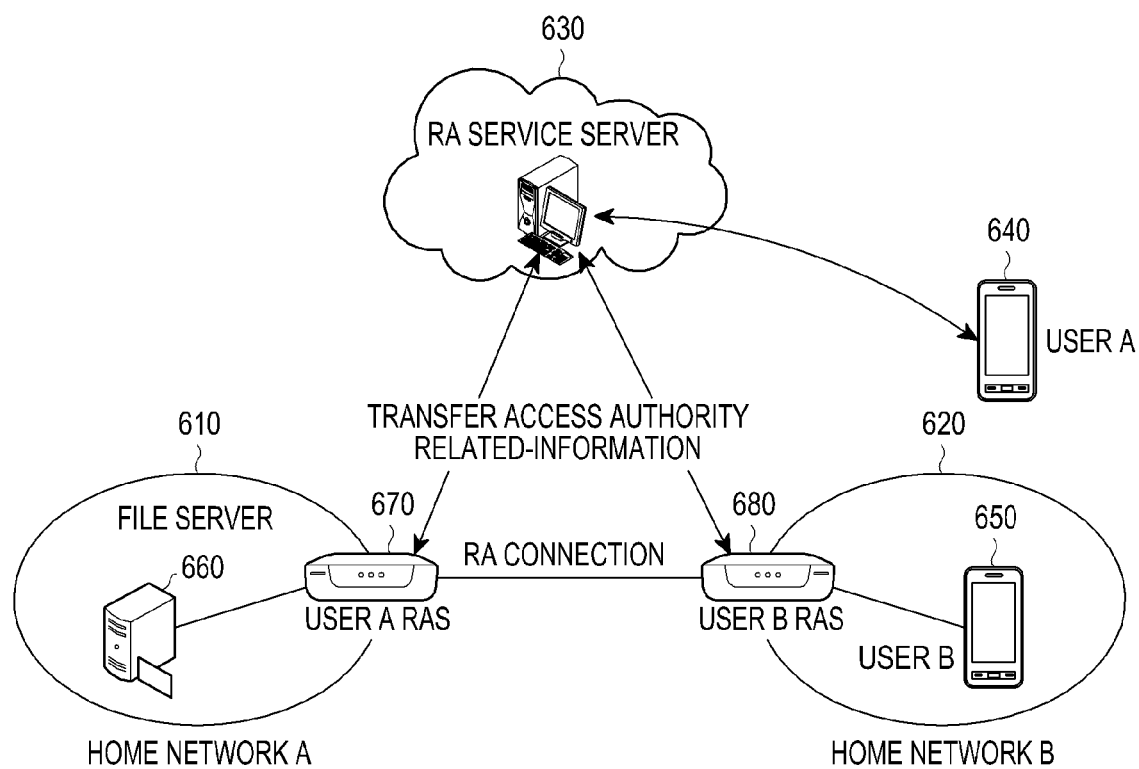
FIG. 6 illustrates a remote access service architecture for managing provider based remote access authority information between home networks according to an embodiment of the present invention.

FIG. 6 is a view illustrating a remote access service architecture for managing provider based remote access authority information between home networks according to an embodiment of the present invention FIG. 6 illustrates a network structure for managing access authority information in the RA connection between two home networks. Referring to FIG. 6, user B 650 is located in a home network B 620 and a situation, in which user B takes a file from a file server 660 in a home network A 610 of user A, is illustrated.

For the RA connection between the two home networks, a remote access connection between RASs of the home network A 610 the home network B 60 is necessary. Since a remote access connection setup is possible only when information of the RAS 680 of user B is included in the access authority list of the RAS 670 of user A, the access authority information management required for the RA connection setup between the RAS and the RAC can be equally applied to the RA connection setup between the RAS and the RAS.

According to the method and the apparatus for managing the remote access authority of the present invention, even in cases where the user is located at the outside the home, the user can modify the access authority list of the RAS in the user's home. Further, the user does not need to directly manage the RAS list, which the user can access, and can be provided the RAS list by the service provider, thereby making it more convenient for the user.

Further, as the service provider manages the access authority list for the user, the convenience for the user is increased. Therefore, the service provider can have additional subscribers and charge the user for the service.

Moreover, the user can remotely manage the access authority information while not inside the home and inquire information of the RAS (Home network), which the user can access.

As described above, operations and constructions of the method and apparatus for managing the remote access authority information based on the service provider according to an embodiment of the present invention can be implemented. While, in the above description, certain embodiments are discussed, various modifications may be made therein without departing from the spirit and scope of the invention.

What is claimed is:

1. A method for managing remote access authority information by a remote access service server, the method comprising:

receiving, by the remote access service server, a remote access authority list from a remote access server for a first user;

registering and storing the remote access authority list;

receiving a remote access authority addition request for a second user from a communication device of the first user;

giving a remote access authority to the second user;

renewing the remote access authority list;

transmitting information of the remote access authority given to the second user to the remote access server of the first user in order to synchronize the renewed access authority list with the remote access server of the first user;

notifying the communication device of the first user whether the remote access authority addition was successful;

receiving an access authority list request from a remote access client of the first user or the remote access server of the first user;

authenticating the access authority list request; and
transmitting an access authority list related to the first user to the remote access client of the first user or the remote access server of the first user.

2. The method of claim 1, further comprising:
performing a remote access service between a remote access client of the second user and the remote access server of the first user.

3. The method of claim 1, further comprising:
performing a remote access service between a remote access server of the second user and the remote access server of the first user.

4. The method of claim 1, wherein the remote access authority addition request comprises:
a user ID;
an ID of the remote access server which is a subject of the remote access;
a device ID to be given remote access; and
nickname information.

5. The method of claim 1, wherein the access authority list request transmitted from the remote access client of the first user or the remote access server of the first user comprises:
a user ID;
a remote access client ID;
a remote access server ID;
a remote access server which is a subject of the remote access;
a nickname; and
address information.

6. The method of claim 1, wherein a HyperText Transfer Protocol (HTTP) or a Session Initiation Protocol (SIP) is used to perform a data exchange between the remote access service server and other devices.

7. A remote access service server for managing remote access authority information, the server comprising:
a Request Message Processor to receive a remote access authority list from a remote access server of a first user and a remote access authority list request;
an Authentication Processor to perform an authentication of the received request message;
a Database Manager to store the remote access authority list;
a Database Access Processor to read an access authority list data from the database manager;
a Response Message Processor to process a response message according to a control of an Access Authority List Processor;
the Access Authority List Processor to give a remote access authority to a second user and renew the remote access authority list when the Access Authority List Processor receives a remote access authority addition request of the second user from a communication device of the first user, to transmit new remote access authority information to the remote access server of the fist user through the Response Message Processor in order to synchronize a renewed access authority list with the remote access server of the first user, and to notify the communication device of the first user of a fact whether the remote access authority addition is successful.

8. The remote access service server of claim 7, wherein the remote access authority addition request comprises a user ID, an ID of the remote access server which is a subject of the remote access, an ID of a device to be subjected to the remote access, and nickname information.

9. The remote access service server of claim 7, wherein the Access Authority List Processor controls such that an access authority list related to the first user is transmitted to a remote access client of the first user or the remote access server of the first user.

10. The remote access service server of claim 9, wherein the access authority list request transmitted from the remote access client or the remote access server of the first user comprises a user ID, a remote access client ID or a remote access server ID, a remote access server ID which is a subject of a remote access, a nickname, and address information.

11. The remote access service server of claim 7, wherein a HyperText Transfer Protocol (HTTP) or a Session Initiation Protocol (SIP) is used for a data exchange between the remote access service server and other devices.

\* \* \* \* \*